United States Patent Office 2,766,192
Patented Oct. 9, 1956

2,766,192

PROCESS FOR CONCENTRATION OF UNSATURATED ALDEHYDES

John Howlett and Cecil Alfred Lamburd, Tonbridge, England, assignors to The Distillers Company Limited, Edinburgh, Scotland, a British company No Drawing. Application November 4, 1950, Serial No. 194,192

7 Claims. (Cl. 202—52)

The present invention refers to the distillation of dilute aqueous solutions of unsaturated aldehydes and the recovery of said aldehydes in a concentrated form and refers in particular to the recovery of acrolein and methacrolein.

When acrolein and methacrolein are produced for instance by the catalytic oxidation in the gaseous phase of propylene and isobutene by means of molecular oxygen they are preferably extracted from the reaction mixture coming from the reactor by scrubbing with water. The aqueous solutions of said aldehydes so produced are dilute and it is necessary to distil said solutions in order to recover the aldehydes in a concentrated form. When these solutions were introduced into a distillation column it was found that the column was soon fouled by the formation of solid polymers which not only involved some loss of the desired unsaturated aldehyde but also made the distillation column unusable.

When the distillation, for instance, is carried out in the ordinary way the rectifying column becomes unworkable through the deposition of polymeric material in a matter of 3 to 4 days, and it has been discovered that the formation of polymeric material is due at least partly to oxygen absorbed in the aqueous aldehyde solution.

By the addition of hydroquinone either to the still feed or to the still column head in an amount equivalent to the theoretical amount required for full oxygen saturation of the still feed, polymer formation can be reduced only to a limited extent, and the use of hydroquinone considerably in excess of the theoretical amount increased the working period of the stills to not more than 15 days.

The use of hydroquinone in such amounts is costly and represents a considerable portion of the total costs of production of the aldehydes.

It has now been found that the formation of polymers during the distillation of the aqueous solutions can very largely be avoided and the operational period of the still considerably extended by carrying out the distillation under reduced pressure.

The pressure under which the distillation is carried out according to this invention may vary within very wide limits, the upper limit being preferably not substantially higher than 400 mm. mercury. Its lower limit is given by economical considerations since operating at very low pressures requires for the condensation of the distillate the application of refrigerated cooling liquids. Generally, a pressure of between 200 and 400 mm. mercury will be effective in preventing formation of polymers and will extend the operational period of the distillation equipment for a long time. Thus, for example, distillation at a pressure of 400 mm. Hg of an aqueous solution of acrolein having a pH of 6.5 was carried out for 25 days with only a very limited amount of polymer formation in the still column. It is to be understood that the process of the invention is not restricted to the use of pressures between 400 to 200 mm. Hg absolute. These pressures are, however, preferred since they are sufficiently low to give effective working and yet do not reduce the boiling points of the unsaturated aldehydes to such degree as to require refrigeration in the condensation of the vapours.

It is surprising that the simple expedient of effecting the distillation under reduced pressure should produce this marked effect of preventing the formation of polymers to a very large extent in the presence of oxygen both in the still feed and in the still column, whilst the distillation proceeds.

The distillation is carried out whilst the pH in the solution to be distilled is maintained at between 5 and 8, preferably between 6 and 7.

By the addition of small amounts of hydroquinone the working period of the distillation equipment can be prolonged still further. Thus, for instance, by introducing into the still head a quantity of hydroquinone equivalent to only one-twentieth ($1/20$) of the theoretical oxygen requirements and operating at a reduced pressure of 400 mm. Hg, the still was maintained in use for 35 days without a visible sign of polymer formation. This represents a great saving in costs, not only of chemicals because the amount of hydroquinone used is only a small one, but also in operational maintenance and reduces the need for additional standby equipment necessary to prevent discontinuity in operation.

In order to carry out the process of the invention the dilute aqueous solution of the unsaturated aldehyde may be fed into a packed column or a column provided with bubble caps and in which a pressure of between 200 and 400 mm. Hg absolute prevails, whilst the column may be heated either externally or internally, e. g. by blowing in live steam at the bottom. The unsaturated aldehyde distils off at the top of the column, and may be condensed in a suitable condenser whilst the stripped aqueous solution leaves the column at the bottom.

The following examples illustrate the manner in which the process of the invention may be carried out in practice. It should be understood, however, that the process of the invention is not restricted to the treatment of acrolein and methacrolein solutions, but may similarly be applied to the concentration of dilute aqueous solutions of other unsaturated aldehydes, which tend to polymerise when subjected to distillation.

Example 1

To a glass kettle was attached a glass tube of 4 ft. length and a diameter of 1½ inch serving as a stripping column, surmounted by a further 4 ft. of 1 inch diameter glass tube to serve as a rectifying column. Both tubes were packed with ¼ inch rings.

5 to 6 litres per hour of a preheated aqueous solution of acrolein containing 0.3 to 0.4% by weight of acrolein were fed into the kettle which was heated to 83° to 84° C. and kept under a pressure of 400 mm. Hg absolute: the temperature at the still head was 35° to 36° C., the pH of the feed was 5.5 to 6.5 and the strength of the distillate amounted to 96.4% by weight of acrolein as determined by the hydroxylamine method. The still was operated for a period of 8 days, at the end of which time there was only very slight deposit of polymer.

Example 2

A still as described in Example 1 was fed with an aqueous solution of acrolein containing 0.4% by weight of acrolein and the conditions of the distillation were similar to those described in Example 1 except that 5 to 10 ccs. per hour of an 0.4% solution of hydroquinone in acrolein were added to the distillate at the entrance to the condensing system. The still ran for 51½ days yielding a similar concentration of 96% by weight of acrolein. At the end of this time only a slight polymer film could be observed at the position where two phases are present in the stripping column.

*Example 3*

The still described in Example 1 was used for the distillation of an aqueous methacrolein solution which was fed into the still kettle. The feed concentration amounted to 0.3% by weight of methacrolein. The pressure was maintained at 400 mm. Hg absolute. The kettle temperature was 83–84° C. and the temperature at the still head 47° C. The pH of the solution ranged between 6.0 and 7.0. A two-phase distillate was obtained the top layer amounting to 98% by volume containing 96% by weight of methacrolein, whilst the bottom layer consisted of an aqueous solution of methacrolein containing 6% by weight of methacrolein. The distillation was carried on for 15 days with only a slight formation of polymer at the end of that period.

*Example 4*

Distillation of a methacrolein solution as described in Example 3 was carried out at a pressure of 250 mm. Hg absolute. The kettle temperature was 75° C. and the still head temperature 37° C. About 5 ccs. per hour of 0.4% hydroquinone solution in methacrolein was added. The top layer of the distillate contained 97% by weight of methacrolein and the bottom layer 6.3% of methacrolein. A slight formation of polymer was observed after a period of 25 days.

We claim:

1. In a distillation process for the recovery of aldehydes, comprising the steps of feeding an unsaturated aliphatic aldehyde from the catalytic oxidation of an olefine, said aldehyde containing absorbed free oxygen which tends to polymerize on ordinary distillation, to a scrubber to produce a dilute aqueous solution of said aldehyde, then directly feeding said dilute aldehyde to a stripping column to obtain said aldehyde, the improvement which comprises the step of distilling said dilute solution of aldehyde in said stripping column under reduced pressure of about 400 mm. of mercury or less to prevent substantially such polymerization.

2. Process according to claim 1, wherein the pressure is between 200 and 400 mm. Hg.

3. Process according to claim 1, characterised by a pH value of the aqueous solution of between 5 and 8.

4. Process according to claim 1, characterised by the addition into the still of a small amount of hydroquinone.

5. Process according to claim 4, wherein the amount of hydroquinone is equivalent to approximately one-twentieth of the theoretical amount required for full oxygen saturation in the still feed solution.

6. Process as claimed in claim 1, wherein the unsaturated aldehyde is acrolein.

7. Process as claimed in claim 1, wherein the unsaturated aldehyde is methacrolein.

References Cited in the file of this patent

UNITED STATES PATENTS

| | | |
|---|---|---|
| 1,967,225 | Conoway | July 24, 1934 |
| 2,261,704 | Wagner | Nov. 4, 1941 |
| 2,289,534 | Wagner | July 14, 1942 |
| 2,402,133 | Gresham et al. | June 18, 1946 |
| 2,501,144 | Saunders | Mar. 21, 1950 |
| 2,514,966 | Pierotti et al. | July 11, 1950 |

OTHER REFERENCES

Richter: "Organic Chemistry," published by P. Blakiston's Son & Co., 1012 Walnut Street, Philadelphia, Pa., 1919, vol. I, page 191.